US012603465B2

(12) United States Patent
Guadarrama et al.

(10) Patent No.: US 12,603,465 B2
(45) Date of Patent: Apr. 14, 2026

(54) AUTOMOTIVE DC/AC POWER INVERTER AND POWER OUTLET WITH PLUG-DETECT MODE

(71) Applicant: Ford Global Technologies, LLC, Dearborn, MI (US)

(72) Inventors: Jesus Guadarrama, Amecameca (MX); Tania Cristina Vazquez, Benito Juarez (MX); Oswaldo Arias, Cuautitlan Izcalli (MX); Enrique Denicia, Miguel Hidalgo (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 848 days.

(21) Appl. No.: 17/881,232

(22) Filed: Aug. 4, 2022

(65) Prior Publication Data

US 2024/0047926 A1     Feb. 8, 2024

(51) Int. Cl.
| | |
|---|---|
| *H01R 13/66* | (2006.01) |
| *B60L 53/16* | (2019.01) |
| *B60L 53/30* | (2019.01) |

(52) U.S. Cl.
CPC .......... *H01R 13/6683* (2013.01); *B60L 53/16* (2019.02); *B60L 53/305* (2019.02); *H01R 2201/26* (2013.01)

(58) Field of Classification Search
CPC ............ H01R 13/6683; H01R 2201/26; B60L 53/305; B60L 53/16

USPC ......................................................... 320/109
See application file for complete search history.

(56) References Cited

U.S. PATENT DOCUMENTS

| | | | | |
|---|---|---|---|---|
| 6,528,957 | B1 | 3/2003 | Luchaco | |
| 10,516,347 | B1 | 12/2019 | Pisau et al. | |
| 11,958,362 | B1 * | 4/2024 | Stockmeier | B60L 1/006 |
| 2011/0068819 | A1 | 3/2011 | Sims et al. | |
| 2012/0212076 | A1 * | 8/2012 | Lu | H01R 13/713 |
| | | | | 307/125 |
| 2013/0342163 | A1 * | 12/2013 | Naruse | B60L 50/16 |
| | | | | 320/109 |
| 2014/0035512 | A1 * | 2/2014 | Kamachi | H02J 7/0042 |
| | | | | 320/109 |
| 2017/0358921 | A1 * | 12/2017 | Ito | H02H 7/1227 |
| 2018/0034268 | A1 * | 2/2018 | Motsenbocker | H02J 1/06 |
| 2020/0055473 | A1 * | 2/2020 | Ferrel | B60L 7/14 |
| 2020/0062125 | A1 * | 2/2020 | Brauner | H02J 7/0063 |
| 2023/0049374 | A1 * | 2/2023 | Kinomura | H02J 7/0063 |
| 2024/0266967 | A1 * | 8/2024 | Ishikawa | H02M 7/4826 |

FOREIGN PATENT DOCUMENTS

| | | |
|---|---|---|
| JP | 2015139327 A | 7/2015 |
| WO | 2015157105 A1 | 10/2015 |

* cited by examiner

*Primary Examiner* — Suchin Parihar
(74) *Attorney, Agent, or Firm* — Frank Lollo; Brooks Kushman P.C.

(57) ABSTRACT

A DC/AC power inverter of an automotive vehicle receives DC power, outputs DC power to an electrical outlet of the automotive vehicle and, responsive to receiving a communication signal from the electrical outlet indicating a plug has been electrically coupled with the electrical outlet, outputs AC power to the electrical outlet.

12 Claims, 4 Drawing Sheets

AUTOMOTIVE DC/AC POWER INVERTER AND POWER OUTLET WITH PLUG-DETECT MODE

TECHNICAL FIELD

This disclosure relates to automotive power systems that include a source of electrical energy and an electrical outlet to access that energy.

BACKGROUND

Certain vehicles (e.g., electric vehicles) may store substantial amounts of energy in traction batteries or the like. This energy may be used to drive the vehicle. Electrical energy, for example, may be input to an electric machine, and mechanical energy may be output by the electric machine to propel a driveshaft and corresponding wheels of the vehicle. Other vehicles (e.g., conventional internal combustion vehicles) may generate electrical energy via operation of an internal combustion engine and corresponding alternator. An auxiliary battery or the like may store this energy for later use by accessory functions of the vehicle.

The electrical energies mentioned above may additionally be used to power various accessories or tools provided that it is accessible. Vehicles may thus include power outlets that can, for example, receive a plug of a power cord.

SUMMARY

An automotive power system includes an electrical outlet and a DC/AC power inverter. The DC/AC power inverter receives DC power as input and selectively provides DC power or AC power as output responsive to a communication signal from the electrical outlet such that the DC/AC power inverter outputs DC power to the electrical outlet during absence of a plug being coupled to the electrical outlet and outputs AC power to the electrical outlet during presence of a plug being coupled to the electrical outlet.

The electrical outlet may include sensing circuitry that, in response to detecting a voltage that exceeds a threshold due to a change from absence to presence of a plug being coupled to the electrical outlet, generates the communication signal. The sensing circuitry may include a Zener diode having a breakdown voltage that defines the threshold. The sensing circuitry may include an opto isolator electrically connected with the Zener diode. The automotive power system may further include a local interconnect network communicably connecting the electrical outlet and DC/AC power inverter. The communication signal may be transmitted over the local interconnect network. The DC/AC power inverter may include a plurality of switches. Some, but not all, of the switches may be continuously ON while the DC/AC power inverter outputs DC power. Some of the switches may be toggled between being ON and OFF while the DC/AC power inverter outputs AC power.

A method includes, while an electrical outlet of a vehicle does not have a plug electrically coupled therewith, generating by a DC/AC power inverter of the vehicle DC power for the electrical outlet, and while the electrical outlet has a plug electrically coupled therewith, generating by the DC/AC power inverter AC power for the electrical outlet.

The method may further include generating by the electrical outlet a communication signal responsive to a plug being electrically coupled with the electrical outlet. The generating by the DC/AC power inverter the AC power for the electrical outlet may be responsive to receipt of the communication signal by the DC/AC power inverter. The method may further include transmitting the communication signal over a local interconnect network. The method may further include generating by an opto isolator of the electrical outlet a signal after a plug is electrically coupled with the electrical outlet. The method may further include detecting by sensing circuitry of the electrical outlet a voltage that exceeds a threshold due to a plug being electrically coupled with the electrical outlet and generating a communication signal for the DC/AC power inverter. The generating the communication signal for the DC/AC power inverter may include activating an opto isolator.

A vehicle includes a traction battery and a DC/AC power inverter. The DC/AC power inverter receives DC power originating from the traction battery, outputs DC power to an electrical outlet of the vehicle and, responsive to receiving a communication signal from the electrical outlet indicating a plug has been electrically coupled with the electrical outlet, outputs AC power to the electrical outlet.

The vehicle may further include the electrical outlet. The electrical outlet may include sensing circuitry that, in response to detecting the plug has been electrically coupled with the electrical outlet, generates the communication signal. The sensing circuitry may include a Zener diode. The detecting the plug has been electrically coupled with the electrical outlet may include a voltage exceeding a breakdown voltage of the Zener diode. The detecting the plug has been electrically coupled with the electrical outlet may include detecting a voltage exceeding a threshold. The sensing circuitry may include an opto isolator. The detecting the plug has been electrically coupled with the electrical outlet may include activating the opto isolator. The vehicle may further include a local interconnect network that carries the communication signal.

BRIEF DESCRIPTION OF THE DRAWINGS

In the following detailed description, reference is made to the accompanying figures, which form a part hereof, and in which are shown by way of illustration specific embodiments. Other embodiments, of course, are also contemplated and/or described.

DETAILED DESCRIPTION

Figure 1A:
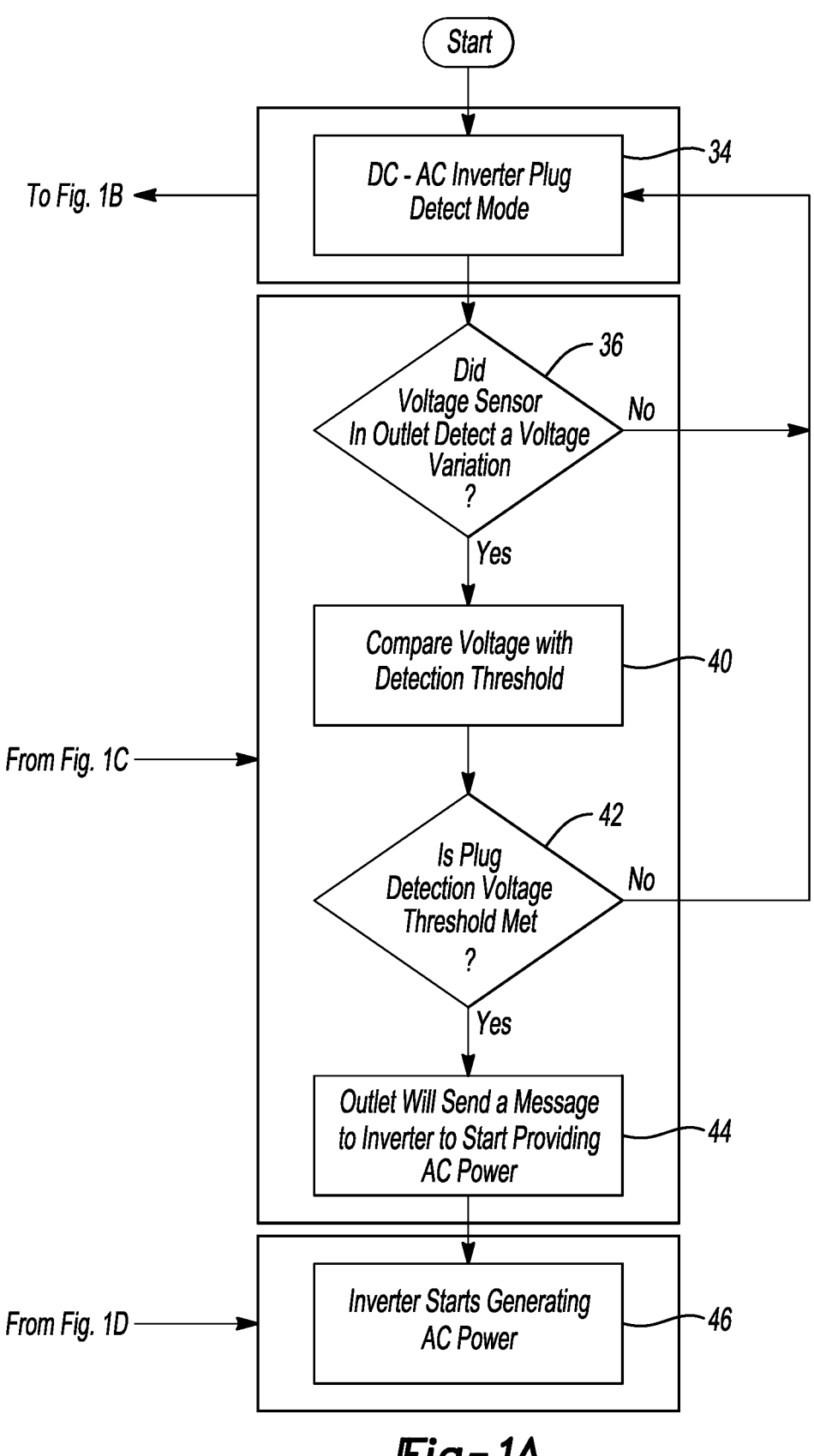
FIG. 1A is a flow chart of an algorithm associated with operation of a DC/AC power inverter in plug-detect mode and AC power mode.
Figures 1B, 1C, 1D:
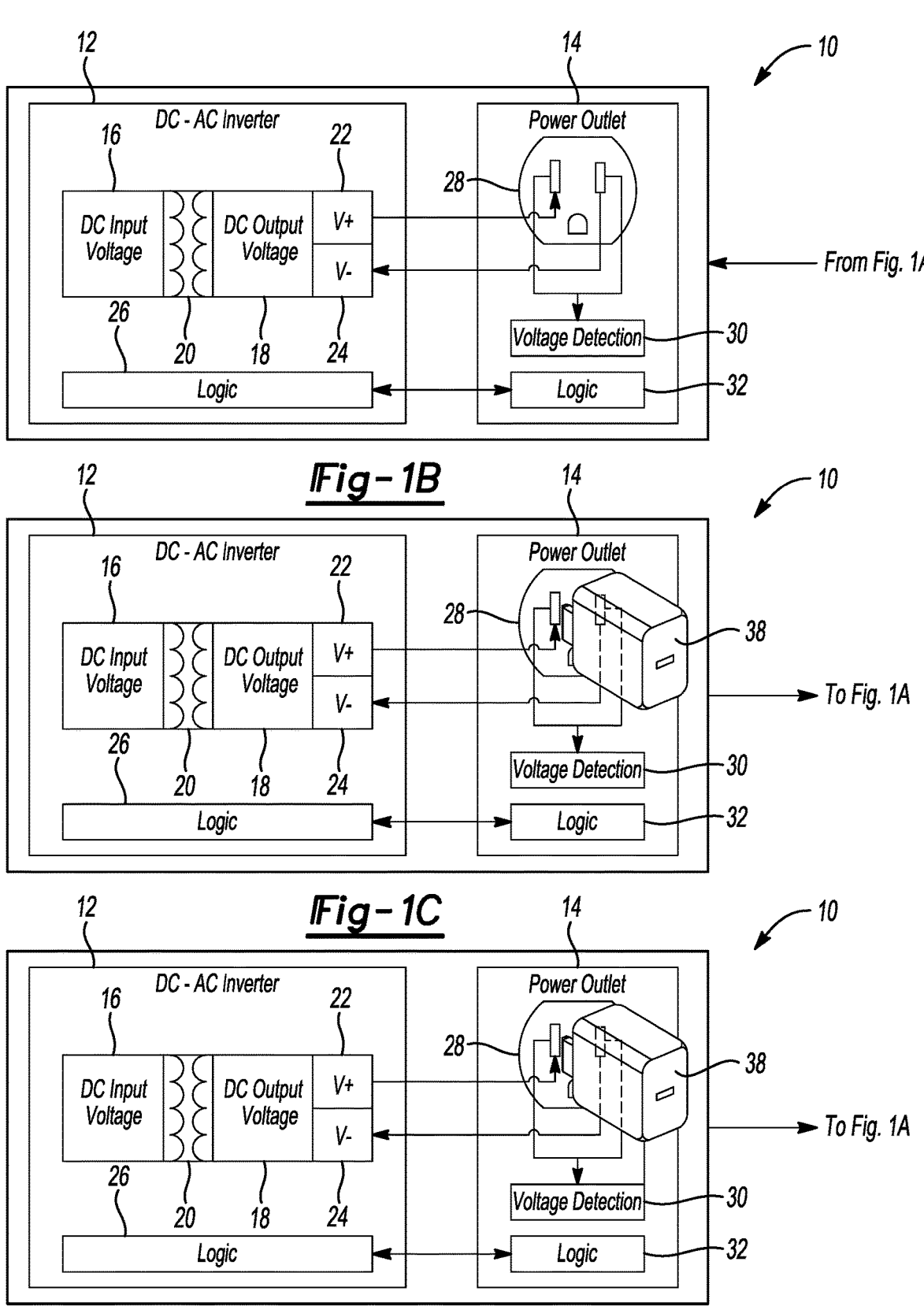
FIGS. 1B and 1C are block diagrams of a DC/AC power inverter and smart outlet during plug-in detect mode.
FIG. 1D is a block diagram of the DC/AC power inverter and smart outlet of FIGS. 1B and 1C during AC power mode.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain automotive DC/AC power inverters provide AC power continuously even with no load connected. Inverters operating in such a fashion may consume up to 8 W to generate an AC voltage and experience an increase in internal temperature. This may reduce fuel economy and require the running of cooling components, such as fans and/or air conditioners, to maintain temperatures within predefined ranges of values. Moreover, fans and air conditioners may produce noise and result in wear when activated.

Here, DC/AC power inverters are contemplated that will selectively operate in a plug-detect mode. In this mode, an inverter may generate a DC voltage between, for example, 100V DC and 140V DC while being limited to 6 mA. Other voltage and current levels are also contemplated and may be determined via simulation and/or testing according to system design requirements. Certain arrangements may take advantage of voltage detection circuitry already present in smart outlets and local interconnect network communication infrastructure already implemented therebetween. Power consumption in this mode may be less than 0.5 W. Terminals of the smart outlet may be an open circuit when no load is connected. When a device, such as a power tool, is plugged in to the smart outlet, the circuit may be closed and the existing voltage sensor embedded therein may detect a voltage variation. If the plug detection voltage threshold is met, the smart outlet may notify the DC/AC power inverter via local interconnect network communication to exit the plug-detect mode and start producing AC power for the device electrically connected therewith.

Because the power consumption of the proposed plug-in detect mode is less than typical arrangements, fuel economy may be less affected. Moreover, operation of cooling components (and the associated noise and mechanical wear) may be reduced as lower power consumption rates will likely translate into lower temperature increases.

Referring to the example of FIGS. 1A through 1D, an automotive power system 10 includes, among other things, a DC/AC power inverter 12 and a smart power outlet 14. The DC/AC power inverter 12 includes input and output portions 16, 18, a transformer 20, terminals 22, 24, and logic 26. The transformer 20 is electrically between the input and output portions 16, 18. The terminals 22, 24 are electrically connected with the output portion 18. The smart power outlet 14 includes a receptacle 28, voltage detection circuitry 30, and logic 32.

At operation 34, the DC/AC inverter enters plug-detect mode in which the DC/AC inverter outputs a DC voltage at the terminals 22, 24. At operation 36, the voltage detection circuitry 30 and logic 32 operate to detect voltage variations at the receptacle 34. If no variation is detected, the algorithm returns to operation 34. If a variation is detected due to, for example, a plug 38 being coupled to the receptacle 28, the logic 32 operates to compare the detected voltage against a predetermined threshold at operation 40. The predetermined threshold may be selected via simulation, testing, etc. and depend on system design and/or other requirements. If the plug detection voltage threshold is not met, the algorithm returns to operation 34. If the plug detection voltage threshold is exceeded, the logic 32 instructs the DC/AC inverter 12 via the logic 26 to produce AC power (instead of DC power) at operation 44. At operation 46, the DC/AC inverter generates AC power. This AC power may then be used by the device electrically connected with the plug 38.

Figure 2:
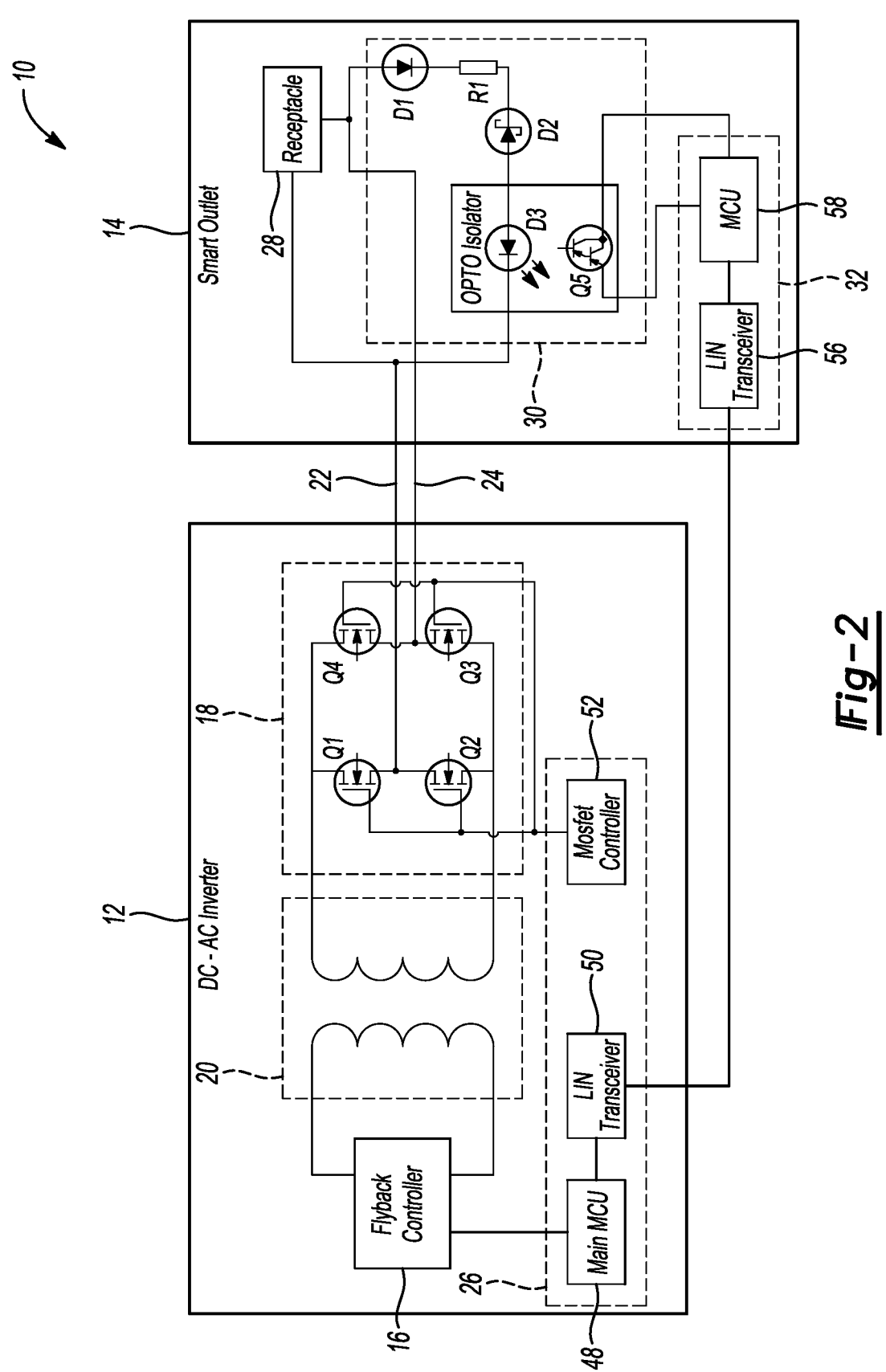
FIG. 2 is a schematic diagram of an example of the DC/AC power inverter and smart outlet of FIGS. 1B through 1C.

Referring to the example of FIG. 2, the input portion 16 includes a flyback controller and the output portion 18 includes metal-oxide-semiconductor field-effect transistors (MOSFETs) Q1, Q2, Q3, Q4. The MOSFETs Q1, Q2 are connected in series to form a first leg and the MOSFETs Q3, Q4 are connected in series to form a second leg. These legs are in parallel. The terminal 22 taps the first leg between the MOSFETs Q1, Q2. The terminal 24 taps the second leg between the MOSFETs Q3, Q4.

The logic 26 in this example includes a main microcontroller unit 48, a local interconnect network transceiver 50, and a MOSFET controller 52. Any suitable logic arrangement, however, may be used. The main microcontroller unit 48 is in communication with the flyback controller 16 and the local interconnect network transceiver 50, and may issue control commands to the flyback controller 16 to prompt the flyback controller 16 to perform various operations consistent with its arrangement. The MOSFET controller 52 is in communication with and may issue control commands to the MOSFETs Q1, Q2, Q3, Q4 to prompt them to perform various switching operations consistent with their arrangement.

The voltage detection circuitry 30 in this example includes diode D1, resistor R1, Zener diode D2, and opto isolator 54. The opto isolator 54 includes diode D3 and MOSFET arrangement Q5. The diode D1, resistor R1, Zener diode D2, and opto isolator 54 are electrically connected in series between the terminal 22 and receptacle 28.

The logic 32 in this example includes a local interconnect network transceiver 56 and a microcontroller unit 58. The microcontroller unit 58 is in communication with the MOSFET arrangement Q5 and local interconnect network transceiver 56, and may issue control commands to the local interconnect network transceiver 56 to cause it, for example, to issue a communication signal to be carried over a corresponding local interconnect network, which is in communication with the local interconnect network transceiver 50.

When a plug is not present at the receptacle 28, the logic 26 may operate the flyback controller 16 and MOSFETs Q1, Q2, Q3, Q4 in plug-in detect mode. Because Q1 and Q3 have high impedance, no current will flow through them. Q2 and Q4 can be used as variable resistors to limit the voltage to some predetermined value (e.g., 6 mA) and reduce the volage output from the flyback controller 16 (e.g., 300V DC) to a predetermined target value (e.g., 120V DC). When voltage at the receptacle 28 exceeds the breakdown voltage of the Zener diode D2 due to, for example, presence of a plug at the receptacle 28, current will flow through the diode D1, resistor R1, and Zener diode D2 to the opto isolator 54, which will activate the opto isolator 54 and result in the MOSFET arrangement Q5 producing a signal indicating that voltage has exceeded some threshold defined by the breakdown voltage of the Zener diode D2. The breakdown voltage of the Zener diode may be selected via simulation, testing, etc. depending on system design and user requirements.

The microcontroller unit 58, responsive to this signal, will send a command to the local interconnect network transceiver 56 for the DC/AC power inverter 12 to generate AC power (AC power mode). The local interconnect network transceiver 56 will transmit the command to the local interconnect network transceiver 50, via the corresponding local interconnect network, which will then provide the command to the main microcontroller unit 48. Responsive thereto, the logic 26 will operate the DC/AC inverter to provide AC power via the output portion 18 instead of DC power via the output portion 18.

Output from the transformer 20 to the output portion 18 is DC. During DC output mode, Q1 and Q3 are OFF, and Q2 and Q4 are ON. Q2 and Q4 can be operated in their ohmic regions such that they behave as a variable resistors. Current thus flows through Q4 to the smart outlet 14, and from the smart outlet 14 through Q2. A pulse width modulated signal could also be used to control Q2 and Q4 to control output voltage of the output portion 18.

During AC output mode, Q1 and Q3 are alternately ON and OFF with Q2 and Q4. When Q1 and Q3 are ON, Q2 and Q4 are OFF. Current thus flows through Q1 to the smart outlet 14, and from the smart outlet 14 through Q3. When Q2 and Q4 are ON, Q1 and Q3 are OFF. Current thus flows through Q4 to the smart outlet 14, and from the smart outlet 14 through Q2. AC power is thus produced.

Figure 3:
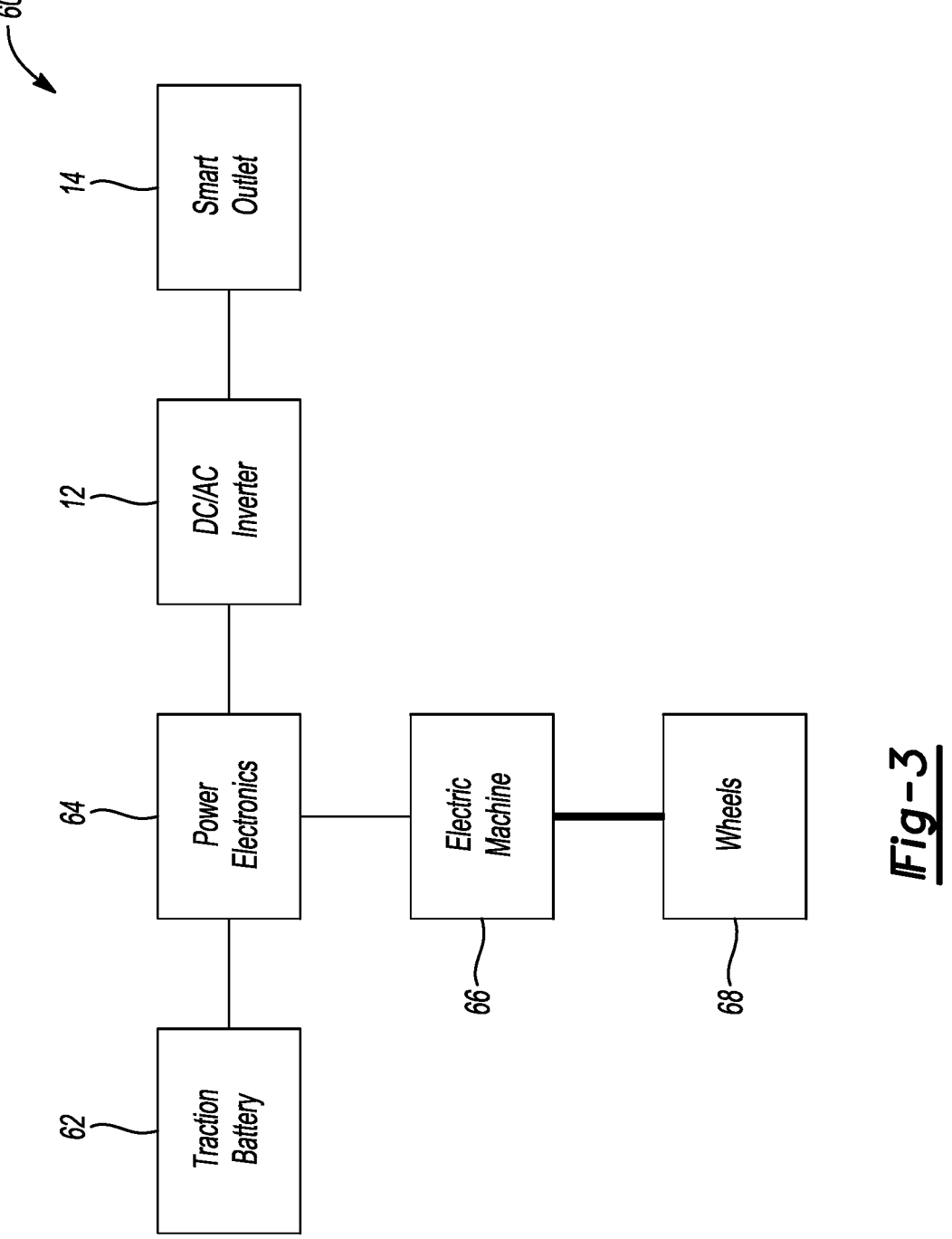
FIG. 3 is a block diagram of portions of a vehicle.

Referring to the example of FIG. 3, a vehicle 60 includes the DC/AC inverter 12, the smart outlet 14, a traction battery 62, power electronics 64, an electric machine 66, and wheels 68. Electrical power from the traction battery 62 may be supplied to the electric machine 66 via the power electronics 64. The electric machine 64 may convert the electrical power to mechanical power to drive the wheels 68. Likewise, mechanical power from the wheels 68 may be transformed by the electric machine 66 to electrical power during regenerative braking for storage in the traction battery 62.

The DC/AC inverter 12 may likewise receive electrical power from the traction battery 62 via the power electronics 64 for use in both the plug-in detect mode and the AC power mode. As described previously, the DC/AC inverter 12 may then output DC power or AC power to the smart outlet 14 depending on whether a plug of a, for example, accessory device is electrically coupled with the smart outlet 14.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. For vehicles that include an engine and lack a traction battery for example, the DC/AC inverters may be connected to, and receive energy from, an alternator (e.g., 24V alternator) or a battery (e.g., 24 V battery). That is, the arrangements contemplated herein may be used in a wide variety of vehicle types and/or configurations. Inverters having switches other than MOS-FETs, e.g., insulated-gate bipolar transistors, etc., may be arranged to perform the operations described. Moreover, the logic 26, voltage detection circuitry 30, and logic 32 may include different and/or other suitable componentry to achieve the functionality described herein. Thus, other topologies and arrangements are also contemplated generally speaking.

The words used in the specification are words of description rather than limitation, and it is understood that various changes may be made without departing from the spirit and scope of these disclosed materials. The words controller and controllers, and variations thereof for example, may be interchanged herein.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive power system comprising:
an electrical outlet including sensing circuitry configured to, in response to detecting a voltage that exceeds a value due to a change from absence to presence of a plug being coupled to the electrical outlet, generate a communication signal, wherein the sensing circuitry includes a Zener diode having a breakdown voltage that defines the value; and
a DC/AC power inverter configured to receive DC power as input and selectively provide DC power or AC power as output responsive to the communication signal such that the DC/AC power inverter outputs DC power to the electrical outlet during absence of the plug being coupled to the electrical outlet and outputs AC power to the electrical outlet during presence of the plug being coupled to the electrical outlet.

2. The automotive power system of claim 1, wherein the sensing circuitry includes an opto isolator electrically connected with the Zener diode.

3. The automotive power system of claim 1 further comprising a local interconnect network communicably connecting the electrical outlet and DC/AC power inverter.

4. The automotive power system of claim 3, wherein the communication signal is transmitted over the local interconnect network.

5. The automotive power system of claim 1, wherein the DC/AC power inverter includes a plurality of switches and wherein some, but not all, of the switches are continuously ON while the DC/AC power inverter outputs DC power.

6. The automotive power system of claim 1, wherein the DC/AC power inverter includes a plurality of switches and wherein some of the switches are toggled between being ON and OFF while the DC/AC power inverter outputs AC power.

7

7. A method comprising:

while an electrical outlet of a vehicle does not have a plug electrically coupled therewith, generating by a DC/AC power inverter of the vehicle DC power for the electrical outlet;

while the electrical outlet has the plug electrically coupled therewith, generating by the DC/AC power inverter AC power for the electrical outlet; and generating by an opto isolator of the electrical outlet a signal for the DC/AC power inverter after the plug is electrically coupled with the electrical outlet.

8. The method of claim 7 further comprising detecting by sensing circuitry of the electrical outlet a voltage that exceeds a threshold due to the plug being electrically coupled with the electrical outlet.

9. A vehicle comprising:

a traction battery;

an electrical outlet including sensing circuitry configured to, in response to detecting a plug has been electrically coupled with the electrical outlet, generate a communication signal, wherein the sensing circuitry includes a Zener diode and wherein the detecting includes a voltage exceeding a breakdown voltage of the Zener diode; and a DC/AC power inverter configured to receive DC power from the traction battery, to output DC power to the electrical outlet of the vehicle and, responsive to receiving a communication signal from the electrical outlet indicating the plug has been electrically coupled with the electrical outlet, to output AC power to the electrical outlet.

10. The vehicle claim 9, wherein the detecting includes detecting a voltage exceeding a value.

11. The vehicle of claim 9, wherein the sensing circuitry includes an opto isolator and wherein the detecting includes activating the opto isolator.

12. The vehicle of claim 9 further comprising a local interconnect network configured to carry the communication signal.

* * * * *